J. F. SHAFER.
VEHICLE AND AUTO TIRE.
APPLICATION FILED SEPT. 13, 1912.
1,140,191.
Patented May 18, 1915.
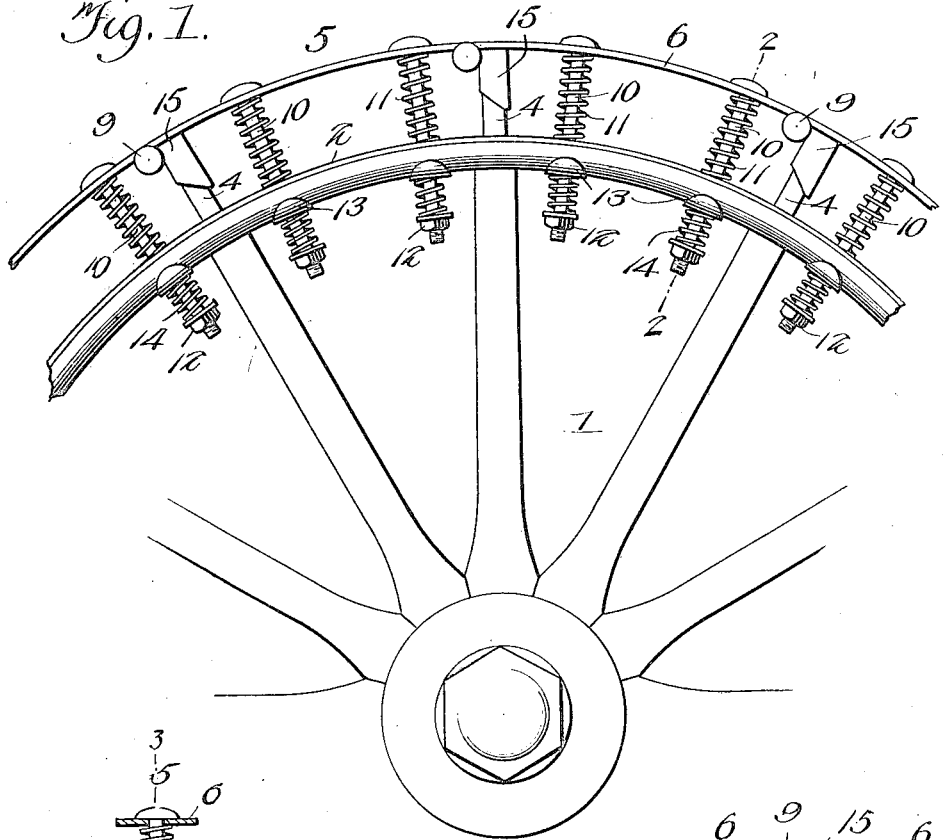
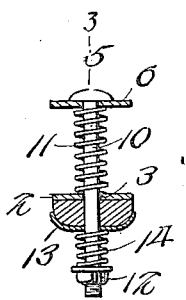
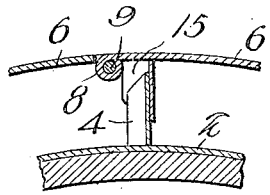
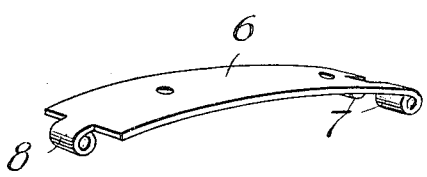
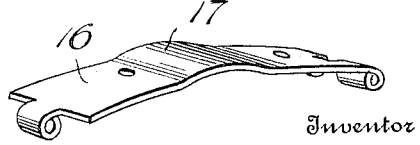
Inventor
John F. Shafer
Witnesses
Hugh H. Ott
Wm. J. Roerth
By Victor J. Evans
Attorney

UNITED STATES PATENT OFFICE.

JOHN F. SHAFER, OF ADELINE, ILLINOIS.

VEHICLE AND AUTO TIRE.

1,140,191. Specification of Letters Patent. Patented May 18, 1915.

Application filed September 13, 1912. Serial No. 720,239.

*To all whom it may concern:*

Be it known that I, JOHN F. SHAFER, a citizen of the United States, residing at Adeline, in the county of Ogle and State of Illinois, have invented new and useful Improvements in Vehicle and Auto Tires, of which the following is a specification.

The present invention relates to vehicle wheels, and particularly to the tires for the wheel.

The primary object of the invention is to provide an ordinary vehicle wheel with an outer tire made up of a plurality of hingedly connected sections, and provided with spring means for sustaining the said outer tire a desired distance from the rim of the wheel, the outer tire being designed to afford a desired amount of elasticity to the wheel and vehicle to absorb the shocks and jars incident to the travel of the wheel over rough surfaces, without discomfort to the occupants of the vehicle.

A still further object of the invention is the provision of a tire of this class which shall have all the advantages of a pneumatic tire, but which, being constructed of metal will obviate the undesirable features of such pneumatic tires, inasmuch as the same shall be proof against punctures as well as against a sliding movement or the accidental displacement of the tire from the rim or the felly of the wheel.

With the above recited objects in view, and others which will appear as the nature of the invention is more fully understood the improvement resides in the novel construction, combination and operative arrangement of parts set forth in the following specification, and falling within the scope of the appended claim.

In the drawing, Figure 1 is a front elevation of a vehicle wheel constructed in accordance with the present invention. Fig. 2 is a transverse sectional view taken approximately upon the line 2—2 of Fig. 1. Fig. 3 is a detail longitudinal sectional view taken approximately upon the line 3—3 of Fig. 2. Fig. 4 is a detail perspective view of one of the tire sections. Fig. 5 is a perspective view of a modified form of one of the tire sections.

In the drawings 1 designates a vehicle wheel and 2 the metal rim which is secured upon the felly or the wheel. The rim and felly are provided with registering elongated openings 3, every two of which being arranged between each pair of spokes for the wheel. The rim intermediate of the openings arranged adjacent each of the sides of each of the spokes is provided with an outwardly extending member 4, and each of said members is preferably disposed in a plane central of each of the spokes.

The numeral 5 designates my improved tread. This tire is made up of a plurality of metallic sections 6 of a desired thickness and of a width equaling the width of the rim 2, and of a length slightly greater or approximately equaling the distance between the spokes of the wheel.

Each section 6 has one of its ends centrally slotted, said ends to the opposite sides of the slot being bent to provide barrels 7, while the opposite end of each of the said members 6 is provided with a centrally arranged projecting portion bent to provide a barrel 8, the said barrel 8 adapted to be received between the barrels 7 of the adjacent section 6, pivots 9 passing through the said barrels to connect all of the sections when the same are arranged around the rim of the wheel. Each section 6 has its inner face adjacent one of its hinged ends provided with a downwardly extending member 15, the same being hollow and having its face, adjacent the pivot 8 open. The member or sleeve 15 is adapted to snugly receive one of the projecting members 4 of the rim 2, the said sleeve and projecting member assisting in retaining the tire 5 against lateral movement with relation to the rim of the tread, and the upper or outer end of the member 4 being in the path of contact with the barrels at the end of said section 6 provided with the said member 15, assists in limiting the creeping or rotary movement of the tread upon the wheel.

10 designates headed bolts which have their shanks passing through openings in the section 6 and through the openings 3 previously referred to. Surrounding the shanks of each of the bolts 10 and exerting a pressure between the rim 2 and the sections 6 of the tire 5 are helical springs 11, while the ends of the bolts which extend inwardly of the rim and felly between the spokes have their ends provided with nuts 12.

13 designate wear plates which are arranged upon the bolts and which contact with the inner face of the felly, and 14 designate springs which are arranged between the plates 13 and the nuts 12. The pivotal connection between the sections 6 permits any of said sections being detached without interfering with the remaining sections, should one of said sections become injured or broken.

Formed or secured to the underface of each of the sections 6 directly forward of its tongue 8 is a sleeve 15. This sleeve has its face next to the tongue 8 open, and each of said sleeves is adapted to receive one of the projecting members 4 of the wheel. The member 4 is frictionally contacted by both the side and connecting wall of the sleeve, but the said member 4 terminates a distance from the upper end of the sleeve, or from its juncture with the section 6. The sleeves co-acting with the members 4 thus prevent a lateral movement of the tire as well as a longitudinal movement of said tire in one direction with relation to the wheel. This arrangement also permits two of the sections of the tire bending at their pivots angularly with relation to the remainder of the tire, as is desirable should the tread of the tire contact with a stone or other obstruction at one of the hinges thereof.

In Fig. 5 of the drawing I have illustrated a slightly modified form of one of the sections making up the metallic tire. This section 16 is substantially similar to each of the sections 6, but the said section 16 is centrally provided with an out-turned curved or bulging portion 17, the bulging portion serving as an anti-skidding device for the tire.

The bolts are preferably provided with openings for the reception of cotter pins which serve as stops for preventing the nuts from working loose upon the bolts.

Having thus described the invention, what I claim is:—

The combination with a vehicle wheel having its felly provided with a metal rim, said rim being formed with outwardly projecting members, a tire, said tire being formed with a plurality of metal sections having their ends pivotally connected, hollow sleeve members formed upon the inner face of each of the metal sections of the tire arranged adjacent one of its pivots and receiving each one of the projecting members of the rim and snugly engaging with the said projecting member, each of the sleeves having its face adjacent the pivot open, said projecting member having its upper end arranged within the path of contact of the said pivotal connection between the sections, and means including guide and spring members for retaining the tire upon the felly of the wheel in spaced relation to and surrounding the rim of the wheel.

In testimony whereof I affix my signature in presence of two witnesses.

JOHN F. SHAFER.

Witnesses:
FRANCES F. EAKLE,
N. C. EAKLE.

Copies of this patent may be obtained for five cents each, by addressing the "Commissioner of Patents, Washington, D. C."